United States Patent [19]
Greenhalgh et al.

[11] 3,934,972
[45] Jan. 27, 1976

[54] DYEING PROCESS

[75] Inventors: Colin William Greenhalgh; David Francis Newton; Dennis Eckersley; Ian Cheetham; Duncan Adrian Sidney Phillips; Kenneth Dunkerley; Gerald Williams; Vibhas Chokshi, all of Manchester, England

[73] Assignee: Imperial Chemical Industries Limited, London, England

[22] Filed: Mar. 18, 1974

[21] Appl. No.: 452,441

[30] Foreign Application Priority Data
Apr. 25, 1973 United Kingdom............... 19580/73
Oct. 16, 1973 United Kingdom............... 48080/73

[52] U.S. Cl.............................. 8/39; 8/1 A; 8/1 B; 8/163; 8/41 B; 8/41 C; 8/21 C
[51] Int. Cl.²..... C09B 1/00; C09B 5/62; D06P 3/82
[58] Field of Search......... 8/39 B, 39 C, 41 B, 41 C, 8/1 A, 1 B, 163, 21 C

[56] References Cited
UNITED STATES PATENTS
3,163,635  12/1964  Riat et al. .......................... 260/153
FOREIGN PATENTS OR APPLICATIONS
1,087,673  10/1967  United Kingdom

*Primary Examiner*—Joseph L. Schofer
*Assistant Examiner*—A. L. Clingman
*Attorney, Agent, or Firm*—Cushman, Darby & Cushman

[57] ABSTRACT

Dyeing cellulose or cellulose/polyester blends by applying unsulphonated dyestuffs containing cyclic anhydride groups, anhydride-forming dicarboxylic acid groups or half-esters or half-amides thereof, as free acids or as salts with ammonia or volatile amines, and heating the fibre until dyestuff fixation takes place.

13 Claims, No Drawings

DYEING PROCESS

This invention relates to a dyeing process for textile fibres comprising cellulose or blends of cellulose with polyester fibres. Throughout this specification and the claims thereof such textile fibres are designated "textile fibres as hereinbefore defined".

The invention provides a process for dyeing textile fibres as hereinbefore defined which comprises applying thereto an unsulphonated dyestuff containing a dicarboxylic cyclic anhydride grouping, or a dicarboxylic acid grouping such that cyclic anhydride formation can occur by loss of water therefrom, or a half-ester or half-amide of such a dicarboxylic acid grouping, any carboxylic acid group in the said dyestuff being present in free acid form or in the form of a salt with ammonia or a volatile amine, and heating the textile fibre until fixation of the dyestuff takes place.

The term half-amide includes half-amides derived from ammonia or from amines of the formula —NHR'R'' wherein R' is hydrogen or an alkyl, substituted alkyl or aryl group and R'' is an alkyl or substituted alkyl group.

Thus the grouping which must be present in the dyestuff to be used in the invention is graphically represented as one of the following alternatives

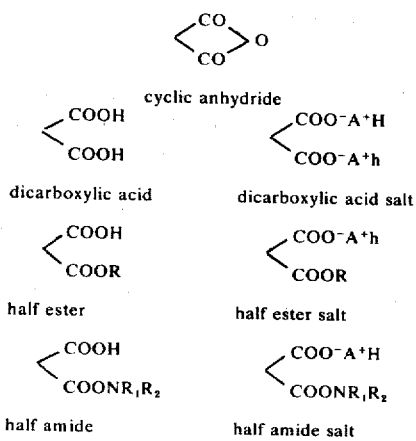

wherein A represents a molecule of ammonia or a volatile amine particularly an aliphatic or cycloaliphatic amine e.g. methylamine, ethylamine, cyclohexylamine, diethylamine, or triethylamine, $R_1$ is hydrogen or an alkyl or substituted alkyl group (e.g. of 1 to 5 carbon atoms) or an aryl group and R is hydrogen or an alkyl or substituted alkyl group (e.g. of 1 to 5 carbon atoms).

It will be understood that the two CO groups in each of the above representations must be in such relative positions that anhydride formation is present or is possible. For example the CO groups may be a. in adjacent positions on a carbocyclic aromatic ring e.g. in ortho position on a benzene ring;

b. in anhydride-forming positions on an alkyl chain e.g. the 1,3- or preferably the 1,2-positions;

c. positioned one on a carbocyclic aromatic ring and one in anhydride-forming position on a side chain, as for example in homophthalic acid.

It will also be understood that more than one of the above groupings may be present and that when such is the case the groupings need not be identical.

Dyestuffs to be used in the process of the invention are more particularly of the azo or anthraquinone series.

Depending upon their solubilities the dyestuffs may be applied to the textile fibre either from solutions or as dispersions.

Thus water-soluble salts (for example salts with ammonia, volatile amines or alkali metals) of the dicarboxylic acids, half-esters or half-amides may be dissolved to form solution dyebaths or padding liquors. When an alkali metal salt is used, then either before or after application to the fibre free carboxylic acid may be liberated by means of mineral or organic acid or a substance which generates an acid on heating, for example ammonium thoocyanate. When a salt with ammonia or a volatile amine is used, then it is not necessary to liberate the free acid.

Alternatively the dyestuffs in free acid or anhydride form may be applied to the textile fibre in the form of fine dispersions in aqueous or organic liquids or mixtures thereof or in the form of solutions in organic liquids.

The dyestuffs may also be applied to the textile fibres as print pastes containing conventional thickening agents e.g. locust bean gum ethers, sodium alginate, gum tragacanth, starch ethers and esters or mixtures of these with stable oil-in-water emulsions.

Print pastes or application liquors may also contain known additives, such as dispersing agents, electrolytes, wetting agents, solubilising assistants, mild oxidising agents, urea or other additives of a type which assist dye fixation.

The heating step of the process is carried out until fixation of the dyestuff on the fibre takes place, by which is meant that at least some of the dyestuff becomes more firmly associated with the fibre through chemical and/or physical interaction, and is therefore more difficult to remove than it is before the heating treatment.

More particularly the dyestuffs may be applied to the textile fibres from an aqueous or non-aqueous liquor or by printing techniques and subsequently baked or steamed, desirably at temperatures above 125°C and preferably at 180° to 210°C.

After carrying out the process of the invention it may be advantageous to treat the textile fibre with a dilute alkali for example 0.05N sodium carbonate in order to remove loose dyestuff from the fibre. Alternatively loose dyestuff may be removed, for example from polyester fiber blended with cellulose, by means of a solvent for the dyestuff such as acetone, at moderate temperatures.

It is probable that the dyestuffs are fixed to cellulose fibres to some extent by chemical reaction with the fibre, possibly by ester links, since the dyestuffs are only partially removed from cellulose by treatment with solvents for the dyes such as boiling pyridine, aqueous pyridine and dimethyl formamide. In this respect the dyestuffs appear to behave in a similar way to known reactive dyestuffs, such as those containing chlorotriazine groupings. However the types of reactive dyestuffs previously known all require the presence of alkali in order that the reaction with the fibre may take place. In the process of the present invention alkali is not required. It is a further advantage of the invention that the dyestuffs used do not undergo irreversible hydrolysis to unreactive compounds either during storage or during the process itself.

It is believed that in the process of the invention cellulose fibre reacts with anhydride dyestuffs which if not originally present are produced thermally from the groupings present in the original dyestuffs.

Polyester fibre does not appear to react with the dyestuff to any significant extent. Anhydride formation, however, improves the dye uptake.

It is a particular merit of the invention that it can be used for the dyeing of cellulose and polyester fibres, in the form of a blend, by the same dyestuff. Hitherto the dyeing of such blends has necessitated the use of mixtures of dyestuffs. No matter whether the two dyestuffs are applied separately or from the same dyebath or padding liquor the processes hitherto used are complex, because different dyeing conditions are required by the fibres. In the present invention the same dyestuff may be used to colour both fibres of the blend from one dyebath, pad liquor or print paste using a simple technique which gives good reproducibility.

We now exemplify some of the types of dyestuff which are to be used in the process of the invention. In this exemplification, for brevity, reference is chiefly made to dicarboxylic acid groupings. It will be understood that in the present invention there may be used the same dyestuffs wherein the dicarboxylic acid groupings are replaced by any of the groupings represented graphically as above.

AZO DYESTUFFS

In azo dyestuffs suitable for use in the process of the invention the dicarboxylic acid grouping may be on the residue of a diazo component (A), a coupling (or end) component (E), a middle component (M) meaning a component which can be coupled with a diazotised azo component and subsequently diazotised for further coupling, or a component (Z) which couples with two (identical or different) diazotised azo component molecules.

Thus, adopting conventional representations of azo dyestuffs, using an arrow to indicate "diazotised and coupled with", dyestuff suitable for use in the process of the invention are for example,

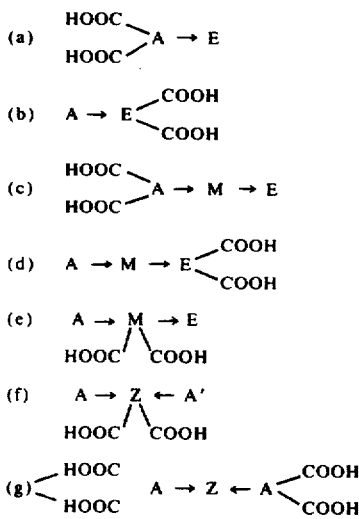

Diazo Components (A) may be, for example of the formulae:

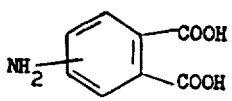
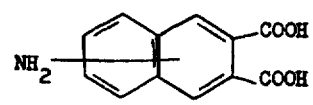
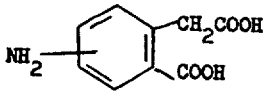
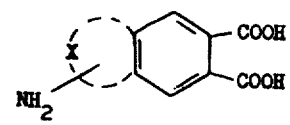

wherein X represents the atoms necessary to complete a (substituted or unsubstituted) heterocyclic aromatic ring.

Specific examples of such diazo components are:

3 and 4-aminophthalic acids,
aminohomophthalic acid,
3-amino-4-cyano-5-methylphthalic acid,
2-amino-5,6-dicarboxybenzthiazole.

The following half esters of 4-aminophthalic acid: methyl, ethyl, n-propyl, iso-propyl, n-butyl, β-hydroxyethyl, β-methoxyethyl, β-ethoxyethyl, cyclohexyl and phenyl.

The half amide of 4-aminophthalic acid and the following N-substituted derivatives of the half amide of 4-aminophthalic acid: methyl, n-butyl, iso-propyl, cyclohexyl, phenyl, tolyl, p-chlorophenyl, diethyl, di-β-hydroxyethyl, methyl phenyl.

Diazo components A may also be of the formula:

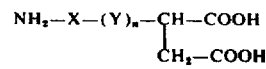

wherein X represents an arylene residue, n is zero or 1, and Y is a linking atom or group, for example of the formula —O—, —S—, —SO₂—, —CO—, —CH₂—, —CONH—, —NHCO—, —NHCO(CH₂)ₘZ— (m being an integer from 1 to 6 and Z is a direct link, —S—, —SO₂—, —NH—, —N acyl— or —N alkyl—), —NH—, —N(COalkyl)—, —N(COaryl)—, —SO₂NH—, —NHSO₂—, —CH₂NH—, —CH₂N-(COalkyl)— or —CH₂N(COaryl)—.

Specific examples of such diazo components are:

4-aminophenylsuccinic acid
4-aminophenylthiosuccinic acid
3- and 4-aminobenzenesulphonylsuccinic acid
4-aminophenoxysuccinic acid 3-aminobenzoylsuccinic acid
3- and 4-aminobenzoylaminosuccinic acid
4-aminophenylaminocarbonylsuccinic acid
4-aminoanilinosuccinic acid
N-acetyl(4-aminophenyl)aminosuccinic acid
3-aminobenzenesulphonylaminosuccinic acid
4-aminophenylaminosulphonylsuccinic acid
4-aminobenzylaminosuccinic acid
N-benzoyl(4-aminobenzyl)aminosuccinic acid
4-aminobenzylsuccinic acid
3- and 4-aminophenylaminoacetylthiosuccinic acid
3- and 4-aminophenylaminoacetylsuccinic acid
The following half esters of 4-aminophenyl succinic acid: methyl, ethyl, n-butyl, β-hydroxyethyl, β-ethoxyethyl, cyclohexyl, phenyl. The half amides of 4-aminophenylsuccinic acid and the following N-substituted derivatives of the half amide of 4-aminophenyl succinic acid: methyl, n-butyl, iso-propyl, cyclohexyl, phenyl, tolyl, p-chlorophenyl, methyl phenyl.

Diazo components (A) may also be of the formula:

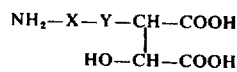

wherein X represents an arylene residue, Y represents a linking atom or group of the formula —O—, —S—, —SO$_2$—, —NH—, —Nacyl—, —Nalkyl—.

Specific examples of such diazo components are:

α-(4-aminophenoxy)β-hydroxysuccinic acid
α-(4-aminobenzyloxy)β-hydroxysuccinic acid
α-(4-aminoanilino)β-hydroxysuccinic acid
α-(4-aminophenylthio)-β-hydroxysuccinic acid
α-(4-aminophenylsulphonyl)-β-hydroxysuccinic acid.

Diazo components (A) may also be of the formula:

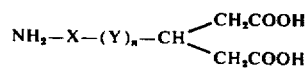

wherein X represents an arylene residue, $n$ is zero or 1, Y represents a linking atom or group of the formula —O—, —S—, —SO$_2$—, —NH—, —NHCO—, —NH—, —N(COalkyl)—, —N(COaryl)—, —SO$_2$NH—, —NHSO$_2$—, —CH$_2$NH—, —CH$_2$NR—, —CH$_2$N(COalkyl)—, —CH$_2$N(COaryl)—, —CONH—.

Specific examples of such diazo components are:

2-(3-aminophenyl)glutaric acid
2-(3-amino-4-methoxyphenyl)glutaric acid
2-(4-aminophenyl)glutaric acid
2-(4-aminophenoxy)glutaric acid
2-(4-aminophenylamino)glutaric acid
2-[N-(4-aminophenyl)acetyl]-aminophenyl)acetylamino]acid
2-(4-aminophenylthio)glutaric acid
2-(4-aminobenzyl)glutaric acid
2-(3-aminobenzenesulphonylamino)glutaric acid.

COUPLING COMPONENTS (E)

1. May be for example of the formula:

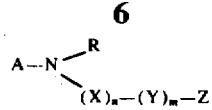

wherein A represents aryl radical, having for example as substituents —NHCOalkyl, —NHCOaryl, —Oalkyl, alkyl, R represents hydrogen or an alkyl or substituted alkyl radical, X represents an alkylene or substituted alkylene radical, $n$ is zero or 1, $m$ is 1 or is zero if $n$ is zero, Y represents —O—, —S—, —SO—, —NH—, —N(alkyl)—, —CONH—, —NHCO—, and Z represents a grouping of the formula:

$$-\underset{\overset{|}{CH_2-COOH}}{CH}-COOH \quad \text{or} \quad -\underset{\overset{|}{CH_2-COOH}}{CH_2}-CH_2-COOH$$

or

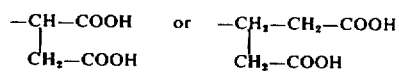

or

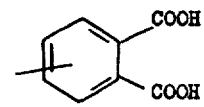

Specific examples of such coupling components are:

N-ethyl-N-[β-(α,β-dicarboxyethylthio)ethyl]aniline
N-ethyl-N-[β-(α,β-dicarboxyethylthio)ethyl]3-toluidine
N-ethyl-N-[β-(α,β-dicarboxyethylthio)ethyl]3-acetylamino aniline
N-ethyl-N-[β-(α,β-dicarboxyethylsulphonyl)ethyl]aniline
N-[β-(α,β-dicarboxyethylaminocarbonyl)ethyl]aniline
anilinosuccinic acid
o-anisidinosuccinic acid
m-toluidinosuccinic acid
m-acetylaminoanilinosuccinic acid
α-(N-methylanilino)-β-hydroxysuccinic acid
N-β-cyanoethyl-N-[β-(α,β-dicarboxyethylthio)ethyl]aniline
N-ethyl-N-[β-(3,4-dicarboxybenzoylamino)ethyl]aniline
N-[β-(α, γ-dicarboxy-n-propylaminocarbonyl)ethyl]aniline.

2. Further coupling components are the acyl derivatives obtained by reacting an amine of the formula:

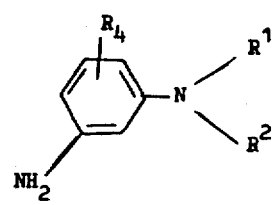

(wherein $R_1$ and $R_2$ are alkyl or substituted alkyl groups and $R_1$ may additionally represent hydrogen, and $R_4$ is hydrogen, alkyl or alkoxy) with a compound of the formula:

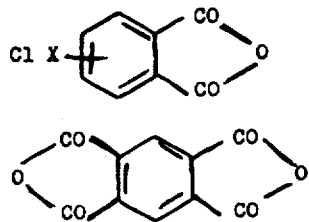

where X = CO, SO$_2$, CH$_2$,

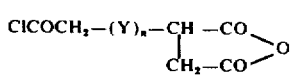

where Y - S, CH$_2$; $n = 0, 1$.
or

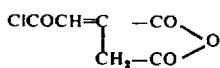

3. Known coupling components containing hydroxyl or amino groups, e.g. pyrazolones, pyrimidines, indoles, 6-hydroxypyridones, acylacetamides, naphthols and naphthylamine derivatives may be converted into coupling agents of the required type by acylation with appropriate dicarboxylic acid derivatives. Thus

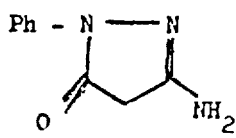

may be reacted with

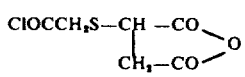

and

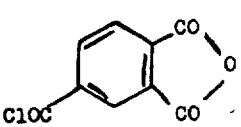

may be reacted with

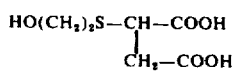

Alternatively coupling components which contain a reactive acyl or halogen group may be reacted with one of the compounds listed above as diazo components or with the amines indicated below.

Thus

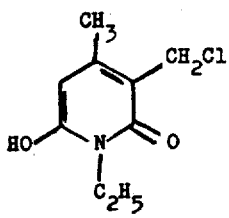

may be reacted with

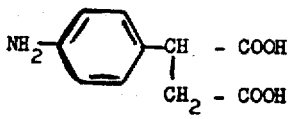

may be reacted with

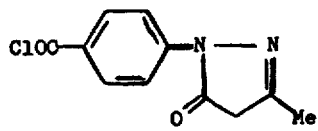

and 2,4-bis diethylamino-6-chloropyrimidine may be reacted with thiosuccinic acid.

Specific examples of heterocyclic coupling components are:

2-methyl-5,6-dicarboxyindole
1-phenyl-2-methylindolyl-5-thiosuccinic acid
1-(3,4-dicarboxyphenyl)-3-methyl-5-pyrazolone.

ALTERNATIVE MANUFACTURE OF AZO DYESTUFFS.

Dyestuffs suitable for use in the invention may also be made from known types of azo dyes by condensation with a compound containing a dicarboxylic acid grouping.

Thus for example azo dyestuffs containing hydroxyl, amino or alkylamino groups may be condensed with an acylating agent containing a dicarboxylic acid grouping, for example with epoxy succinic anhydride or one of the acylating agents indicated in the above sub-paragraph (2) under the heading "Coupling Components".

Alternatively azo dyestuffs containing carboxyl halide groups or "mixed anhydride" groups in which a pendant carboxylic acid group is in anhydride formation with a simple acid such as acetic or benzoic acid, may be condensed with amines listed above as Diazo components (A) or with intermediates such as:

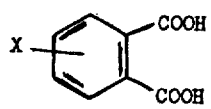 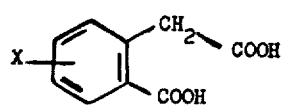

where X represents OH, NH₂, NH alkyl,

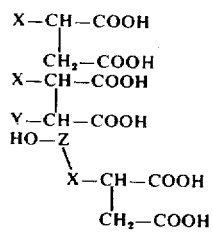

where X represents HO, HS, NH₂, NH alkyl

X represents S-alkyl, S-aryl, NH alkyl, NH aryl, NH acyl; Y represents HO

X represents S, O, SO₂, SO₂NH, CONH
Z represents alkylene, aryl, aralkyl.

ANTHRAQUINONE DYESTUFFS

Anthraquinone dyestuffs suitable for use in the invention are generally obtainable by condensation of known anthraquinone compounds with compounds containing a dicarboxylic acid grouping.

Thus for example anthraquinone compounds containing hydroxyl or amino radicals in pendant groups may be acylated by means of the acylating agents indicated in the above sub-paragraph (2) under the heading "Coupling components". Examples of such anthraquinone compounds are 1-amino-4-hydroxy-2-(4-hydroxyphenoxy)anthraquinone
1-hydroxy-4-(4-aminophenylamino)anthraquinone
1-amino-4-(phenylamino)-2-hydroxymethyl anthraquinone The same acylating agents may be used to acylate anthraquinones containing nuclear amino groups, for example all such anthraquinones as are listed in UK Specification No. 1,087,673 from line 5 on page 8 to the first formula on page 12.

Alternatively anthraquinones containing reactive acyl groups may be condensed with the amines listed as diazo components (A) listed above, or with the amino or hydroxyl compounds indicated as intermediates in the above passage headed "Alternative manufacture of azo dyestuffs".

Thus for example 1-amino-4-phenylamino-anthraquinone-2-carboxylchloride may be condensed with 4-aminophthalic acid.

As a further alternative anthraquinones containing reactive halogen atoms or hydoxyl groups may be condensed with nucleophilic compounds containing a dicarboxylic acid grouping, for example with the diazo components (A) listed above or the amino or hydroxyl compounds indicated as intermediates in the above paragraph on "Alternative manufacture of azo dyestuffs".

Thus for example the following compounds may be condensed:

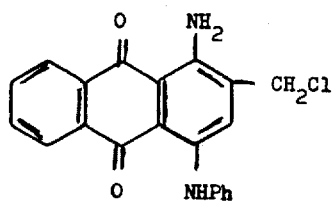 with 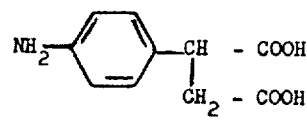

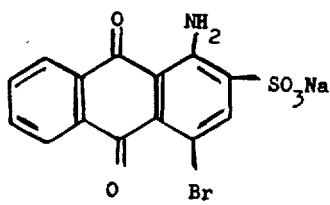 with 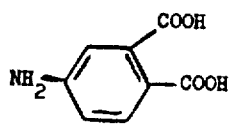

and desulphonated

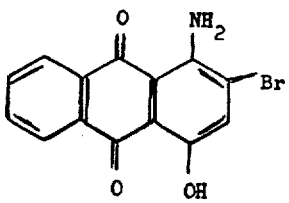 with 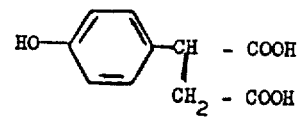

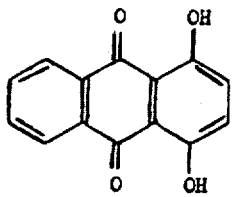 with 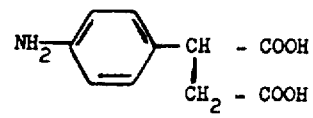

APPLICATION METHODS

In many of the Examples which follow reference is made to Application Methods A to F which are now described.

Application Method A

A piece of woven cotton textile material is impregnated with an aqueous solution of the disodium salt of the dyestuff and the material dried. The fabric is then passed through a bath of dilute sulphuric acid, then washed free of mineral acid and dried. The material is then baked at 210°C for 2 minutes and loose dye removed from the treated fabric by immersion in a bath of 0.1N sodium carbonate for 10 minutes at 90°C. After rinsing free of alkali the dyed fabric is dried at 70°C. The dyed fabric so obtained shows excellent fastness to washing.

Application Method B

A piece of woven cotton textile material is printed by roller application with a milled aqueous dispersion of the dyestuff and the material dried at 70°C. The material is then heated at 200°C for 2 minutes and loose surface dye removed from the treated fabric by heating in 0.2% sodium carbonate solution containing 0.2% of a synthetic organic detergent for 5–10 minutes at 70°C. The print so obtained shows good heat fastness properties.

In the same way textile material comprising cotton/polyester blends is printed. Prints of good wet fastness are obtained.

Application Method C

A piece of woven 67:33 polyester/cotton blended textile material is impregnated with an aqueous solution of the dyestuff in the form of its disodium salt and the material is dried. It is then passed through a bath of dilute sulphuric acid, then washed free of mineral acid and dried. The material is then baked at 210°C. for 2 minutes and loose dye removed from the treated fabric by immersion in a bath of 0.1N sodium carbonate for 10 minutes at 90°C. After rinsing free of alkali the dyed fabric is dried at 70°C. The fabric is dyed in a solid shade of excellent fastness to washing and to heat treatment.

Application Method D

A print paste is prepared according to the following recipe:

| | | |
|---|---|---|
| Dyestuff as 10% aqueous dispersion | 18.6 | g |
| Water | 7.1 | ml |
| Urea | 12.0 | g |
| Ammonia solution S.G. 0.880 | 0.5 | ml |
| Indalca PA3 thickening 9% solution (Locust bean gum ether) | 50 | g |
| Ammonium thiocyanate | 3.3 | g |
| Polyethylene glycol (350) | 8.5 | g |
| | 100 | g |

The paste is applied by printing to cotton and blended polyester/cotton fabrics. After drying the prints are fixed by a treatment in hot air for 2 minutes at 200°C. The prints are then rinsed in cold water, treated for 10 minutes at 100°C in a solution containing 2 g/l soda ash and 3 g/l sodium dodecyl benzene sulphonate, rinsed again in cold water and dried.

Prints are obtained showing good level of fixation. The prints have good fastness properties.

Alternatively fixation of dye may be carried out by steaming in superheated steam for 8 minutes at 180°C in place of hot air process described above.

Alternatively the polyethylene glycol (350) used in the above recipe may be replaced by an equal amount of caprolactam, diethyleneglycol dimethyl ether, thiodiglycol or butyroloctone.

Application Method E

A piece of woven cotton or woven polyester/cotton blended textile material is impregnated with an acetone or aqueous acetone solution of the dyestuff. After drying the material is baked at 200°–210°C for 2 minutes. The material is treated for 10 minutes at 100°C in a solution containing 2 g/l soda ash and 3 g/l sodium dodecylbenzene sulphonate, rinsed again in cold water and dried. The dyed fabrics so obtained show good levels of fixation and have good fastness properties.

Application Method F

A solution of 0.1 part of the dyestuff in 25 parts of 50% aqueous acetone containing 1 part of an amine selected from ammonia, methylamine, ethylamine, diethylamine, triethylamine, ethanolamine or triethanolamine is applied to 10 g of woven cotton textile material or to 10 g of a woven blended polyester/cotton textile material. After drying the textile material is baked at 200°–210°C for 2 minutes. The material is then treated for 10 minutes at 100°C in a solution containing 2 g/l soda ash and 3 g/l sodium dodecyl benzene, rinsed again in cold water and dried. The dyed fabrics so obtained show good levels of fixation and have good fastness properties.

EXAMPLES

The invention is illustrated but not limited by the following Examples in which all parts and percentages are by weight. The preparation of dyestuffs used in the Examples is described in an Appendix which follows them.

EXAMPLE 1

A piece of woven cotton textile material is dyed using the disodium salt of 1-phenyl-3-methyl-4(3,4-dicarboxyphenylazo)-5-pyrazolone (Dyestuff 1) according to Application Method A. The bright yellow dyed fabric so obtained shows excellent fastness to washing. The dye is not extracted by 10 minute successive boilings in dimethyl formamide, pyridine and aqueous pyridine.

EXAMPLE 2

A piece of woven cotton textile material is printed with a milled aqueous dispersion of 1-phenyl-3-methyl-4(3,4-dicarboxyphenylazo)-5-pyrazolone (Dyestuff 1) according to Application Method B. The bright yellow dyeing so obtained shows good fastness properties.

In the same way a textile material comprising cotton/polyester blends is dyed. Yellow prints of good heat and wash features are obtained.

EXAMPLE 3

A piece of woven polyester/cotton blend fabric wherein the ratio of polyester to cotton is 67:33 is dyed with Dyestuff 1 according to Application Method C. The bright yellow solid shade dyeing has excellent heat and wash fastness properties.

EXAMPLE 4

0.5 Parts of N-ethyl-N-β-(α,β-dicarboxyethylthio)ethyl-4-(4-nitrophenylazo)-3-toluidine (Dyestuff 2) is dissolved in 30 parts of water by the addition of 2 parts of 2N sodium hydroxide solution. 0.5 parts of cetyl alcohol/ethylene oxide dispersing agent is added followed by 70 parts of white spirit and the mixture emulsified by a high speed agitator. When finely emulsified the mixture is acidified by the addition of 0.46 parts of maleic acid dissolved in 2 parts of water. The emulsion so obtained has a pH value of 4.61. The emulsion is used to print cotton and polyester/cotton textile materials which are then dried and baked at 200°C for 2 minutes. Loose dye is removed from the fabrics by treating in a bath of 0.5N sodium carbonate for 5–10 minutes at 70°C. On the cotton fabric a brownish red shade having excellent wash fastness is obtained. On the polyester and the polyester/cotton fabrics red shades are obtained which show excellent heat and wash fastness properties.

Similar results are obtained when 20 parts of 10% solution of Manutex F (a sodium alginate) is added to the emulsion prior to printing.

EXAMPLE 5

A milled dispersion of the red dyestuff comprising the anhydride of N,N-diethyl-4(3,4-dicarboxyphenylazo)aniline (Dyestuff 3) is padded onto woven polyester/cotton blend fabric which is dried and then baked at 190°C for 2 minutes. Surface dye is removed by warming to 70°C in a bath containing 0.2% sodium carbonate and 0.2% of a synthetic organic detergent. A bright red shade is obtained which shows good heat and wash fastness properties.

When the above dispersion is applied to polyester fabric from an aqueous bath at 125°C for ½ hour a yellow dyeing of the dyestuff N,N-diethyl-4(3,4-dicarboxyphenylazo)aniline is obtained showing that hydrolysis of the anhydride occurs under these aqueous dyeing conditions.

EXAMPLE 6

In place of the dyestuff used in Example 2 there is used N,N-diethyl-4-(3-carboxy-4-carbomethoxyphenylazo)aniline (Dyestuff 4).

The reddish orange print is obtained on cotton fabric shows good wash fastness properties.

When the dyestuff is applied to polyester/cotton blends as indicated in Example 2 a reddish orange dyeing is obtained which shows excellent wash fastness properties.

EXAMPLE 7

2 Parts of Dyestuff 1 is dissolved in 29.7 parts of water by the addition of 0.8 parts of sodium carbonate and to this solution are added with good agitation 50 parts of a 9% aqueous solution of locust bean gun ether, 2 parts of a 35% aqueous solution of a naphthalene-2-sulphonic acid formaldehyde condensate and 10 parts of urea followed by 5 parts of citric acid.

The paste so obtained is applied by roller printing to a mercerised cotton fabric, dried and heat treated in air at 200°C for 2 minutes, then washed in cold water and treated at the boil in a bath containing 0.2% sodium carbonate and 0.3% sodium dodecylbenzene sulphonate for 10 minutes then rinsed and dried.

A yellow print of good fastness to wet treatments is obtained.

If in place of mercerised cotton the paste is applied to a blend of polyester and cotton, and the same process is used, prints of equally good fastness are obtained.

EXAMPLE 8

The print paste of Example 7 is applied to the same substrates. The prints are fixed by exposure to superheated steam for 8 minutes at 180°C in place of exposure to hot air. Equally good results are obtained.

EXAMPLE 9

A print paste is prepared of the following composition:

| | | |
|---|---|---|
| Dyestuff 1 | 2 | parts |
| Water | 20.7 | parts |
| Sodium carbonate | 0.8 | parts |
| Urea | 20 | parts |
| Sodium Alginate (10% solution) | 50 | parts |
| Anionic Dispersing agent comprising a naphthalene-2-sulphonic acid formaldehyde condensate | 1 | part |
| Ammonium thiocyanate | 4 | parts |

The print paste is applied by screen printing to a cotton fabric, dried in hot air at 70°C, steamed in superheated steam at 180°C for 8 minutes, rinsed and treated at the boil in a bath containing 0.2% sodium carbonate and 0.3% sodium dodecylbenzene sulphonate, then rinsed and dried.

A yellow print of good wet fastness is obtained.

Alternatively, fixation is carried out be a treatment in hot air at 200°C for 2 minutes in place of steaming in superheated steam.

Fabrics made of a cotton/polyester blend may also be used in place of the cotton fabric. In all cases yellow dyeings of good wet fastness are produced.

In Examples 10–30 the dyestuffs listed in the Table I are applied to cotton and polyester/cotton blend (67:33) by the method described in Example 9. The dyestuffs are after-treated at the boil in a bath containing 0.2% of sodium carbonate and 0.3% of sodium dodecylbenzene sulphonate then rinsed and dried.

TABLE I

| Example | DYESTUFF | Dyestuff No. | SHADE ON FIBRE | |
|---|---|---|---|---|
| | | | Cotton | Polyester Cotton |
| 10 | Ph—N—N / O=C—CH(Me) / N=N—C$_6$H$_4$—S—CH(COOH)—CH$_2$—COOH | 5 | Yellow | Yellow |

TABLE 1 (Continued)
| Example | DYESTUFF | Dyestuff No. | SHADE ON FIBRE Cotton | Polyester Cotton |
|---|---|---|---|---|
| 11 | 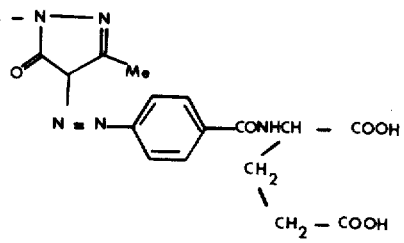 | 6 | Yellow | Yellow |
| 12 | 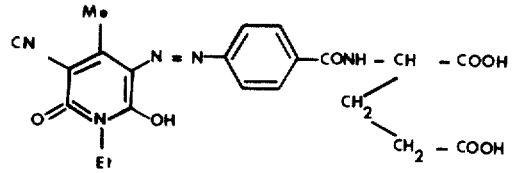 | 7 | Yellow | Yellow |
| 13 | 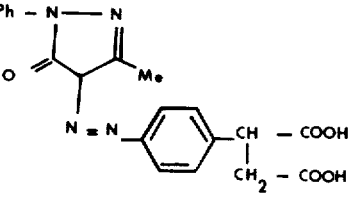 | 8 | Yellow | Yellow |
| 14 | 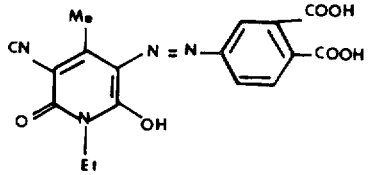 | 9 | Yellow | Greenish-yellow |
| 15 | 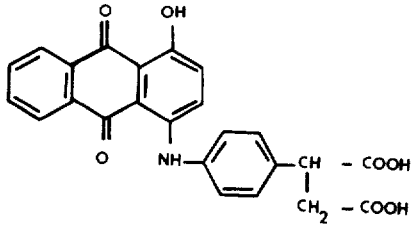 | 10 | Violet | Violet |
| 16 | 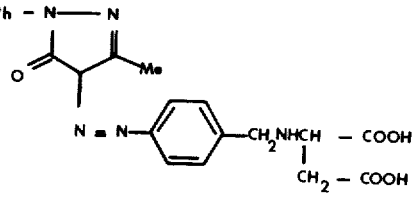 | 11 | Reddish yellow | Reddish yellow |
| 17 | 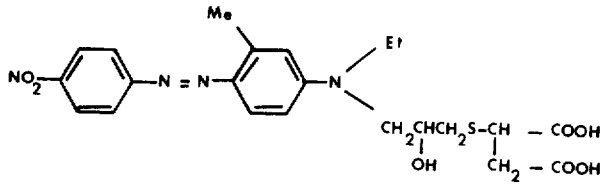 | 12 | Brownish red | Red |

TABLE 1 (Continued)

| Example | DYESTUFF | Dyestuff No. | SHADE ON FIBRE Cotton | SHADE ON FIBRE Polyester Cotton |
|---|---|---|---|---|
| 18 | Ph—N=N / pyrazolone-Me / N=N-C6H3(COOH)(COOMe) | 13 | Yellow | Yellow |
| 19 | Ph—N=N / pyrazolone-Me / N=N-C6H3(COOH)(COOCH2CH2OEt)(Me) | 14 | Yellow | Yellow |
| 20 | NO2-C6H4-N=N-C6H4-NHCH(COOH)CH2-COOH | 15 | Orange brown | Orange brown |
| 21 | NO2-C6H4-N=N-C6H3(OMe)-NHCH(COOH)CH2-COOMe | 16 | Orange brown | Orange brown |
| 22 | NO2-C6H4-N=N-C6H3(OMe)-NH-CH(COOH)CH2-COOH | 17 | Orange brown | Orange brown |
| 23 | pyridone derivative with N=N-Ph-NO2, CN, Me, HO, N-CH2CH2NHSO2-C6H3(COOH)2 | 18 | Yellow | Yellow |
| 24 | naphthol-azo: N=N-C6H3(COOH)2, OH, COOMe | 19 | Red | Red |
| 25 | naphthol-azo: N=N-C6H3(COOH)2, OH, CON(CH2CH2OH)2 | 20 | Red | Red |
| 26 | (MeO)(NH2)(OMe)C6H2-N=N-C6H3(COOH)(COOH) | 21 | Orange brown | Brownish red |

TABLE I (Continued)

| Example | DYESTUFF | Dyestuff No. | SHADE ON FIBRE Cotton | Polyester Cotton |
|---|---|---|---|---|
| 27 | Ph–N–N / Me / O / N=N–(2,5-(OMe)₂-C₆H₂)–N=N–(3,4-(COOH)₂-C₆H₃) (pyrazolone structure) | 22 | Red | Red |
| 28 | 1-hydroxy-4-[4-(3,4-dicarboxyphenylsulfonamido)anilino]anthraquinone | 23 | Reddish blue | Reddish blue |
| 29 | 1-hydroxy-4-[(1-carboxy-2-hydroxy-2-carboxyethyl)amino]anthraquinone | 24 | Dull rubine | Dull rubine |
| 30 | 1,5-dihydroxy-4,8-diamino-anthraquinone condensed with epoxysuccinic acid | 25 | Navy | Navy |

EXAMPLES 31–50

Dyestuffs are applied to fabrics as indicated in Table II. In each case bright yellow dyeings having good fastness properties are obtained. When cotton fabric is used the dye is not extracted by 10 minute successive boilings in dimethyl formamide, pyridine and aqueous pyridine.

Table II

| Example | Dyestuff No. | Fabric | Application Method |
|---|---|---|---|
| 31 | 26 | Cotton | A |
| 32 | 27 | " | A |
| 33 | 28 | " | A |
| 34 | 29 | " | A |
| 35 | 30 | " | A |
| 36 | 26 | Polyester/cotton blend | B |
| 37 | 27 | " | B |
| 38 | 28 | " | B |
| 39 | 29 | " | B |
| 40 | 30 | " | B |

Table II -continued

| Example | Dyestuff No. | Fabric | Application Method |
|---|---|---|---|
| 41 | 26 | Cotton | B |
| 42 | 27 | " | B |
| 43 | 28 | " | B |
| 44 | 29 | " | B |
| 45 | 30 | " | B |
| 46 | 26 | Polyester/cotton | C |
| 47 | 27 | " | C |
| 48 | 28 | " | C |
| 49 | 29 | " | C |
| 50 | 30 | " | C |

EXAMPLES 51–78

Dyestuffs are applied to textile fabrics by Application Method D, with the results indicated in Table III.

TABLE III

| Example | Dyestuff | Dyestuff No. | Shade on Fibre Cotton | Shade on Fibre Polyester Cotton |
|---|---|---|---|---|
| 51 | Ph-N₁-pyrazolone(Me)-N=N-phenyl(COOH)(CON(Et)₂) | 28 | Yellow | Yellow |
| 52 | Ph-N₁-pyrazolone(Me)-N=N-phenyl(COOH)(CONH-cyclohexyl) | 29 | Yellow | Yellow |
| 53 | Ph-N₁-pyrazolone(Me)-N=N-phenyl(COOH)(CONHPh) | 30 | Yellow | Yellow |
| 54 | Ph-N₁-pyrazolone(Me)-N=N-phenyl-S-CH(COOH)-CH₂-COOH | 5 | Yellow | Yellow |
| 55 | Ph-N₁-pyrazolone(Me)-N=N-phenyl-CONHCH(COOH)-CH₂-CH₂-COOH | 6 | Yellow | Yellow |
| 56 | CN-pyridone(Me)(OH)(N-Et)-N=N-phenyl-CONH-CH(COOH)-CH₂-CH₂-COOH | 7 | Yellow | Yellow |
| 57 | Ph-N₁-pyrazolone(Me)-N=N-phenyl-CH(COOH)-CH₂-COOH | 8 | Yellow | Yellow |

TABLE III (Continued)

| Example | DYESTUFF | Dyestuff No. | SHADE ON FIBRE Cotton | SHADE ON FIBRE Polyester Cotton |
|---|---|---|---|---|
| 58 | (structure: pyridone with Me, CN, =O, N-Et, OH, N=N-phenyl-(COOH)$_2$) | 9 | Yellow | Greenish yellow |
| 59 | (anthraquinone with OH and NH-C$_6$H$_4$-CH(COOH)-CH$_2$-COOH) | 10 | Violet | Violet |
| 60 | Ph-N—N pyrazolone with Me, N=N-C$_6$H$_4$-CH$_2$NHCH(COOH)-CH$_2$-COOH | 11 | Reddish yellow | Reddish yellow |
| 61 | NO$_2$-C$_6$H$_4$-N=N-C$_6$H$_3$(Me)-N(Et)(CH$_2$CH(OH)CH$_2$S-CH(COOH)-CH$_2$-COOH) | 12 | Brownish red | Red |
| 62 | Ph-N—N pyrazolone with Me, N=N-C$_6$H$_3$(COOH)$_2$ | 1 | Yellow | Yellow |
| 63 | Ph-N—N pyrazolone with Me, N=N-C$_6$H$_3$(COOH)(COOH) | 31 | Yellow | Yellow |
| 64 | Ph-N—N pyrazolone with Me, N=N-C$_6$H$_3$(COOH)(COOMe) | 13 | Yellow | Yellow |
| 65 | Ph-N—N pyrazolone with Me, N=N-C$_6$H$_3$(COOH)(COOCH$_2$CH$_2$OEt) | 14 | Yellow | Yellow |

TABLE III (Continued)
| Example | DYESTUFF | Dyestuff No. | SHADE ON FIBRE Cotton | SHADE ON FIBRE Polyester Cotton |
|---|---|---|---|---|
| 66 | 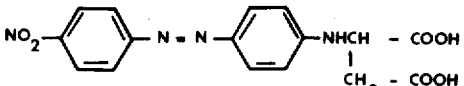 | 15 | Orange brown | Orange brown |
| 67 | 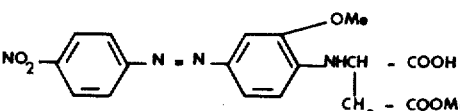 | 16 | Orange brown | Orange brown |
| 68 | 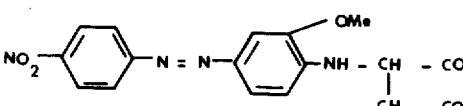 | 17 | Orange brown | Orange brown |
| 69 | 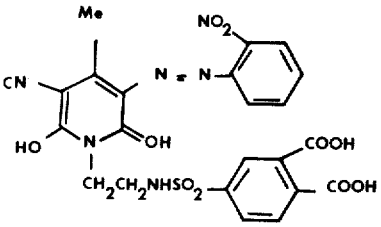 | 18 | Yellow | Yellow |
| 70 | 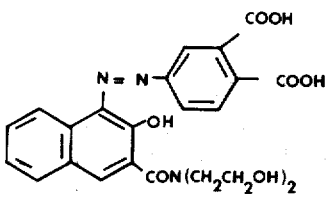 | 19 | Red | Red |
| 71 | 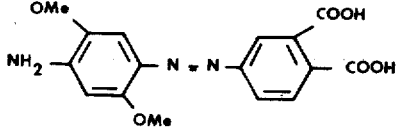 | 21 | Orange brown | Brownish red |
| 73 | 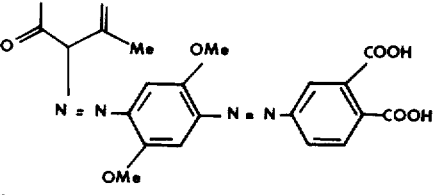 | 22 | Red | Red |
| 74 | 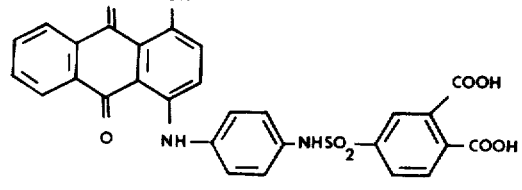 | 23 | Reddish blue | Reddish blue |
| 75 | 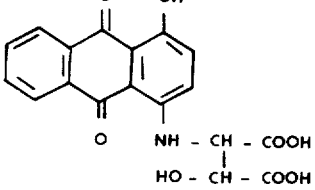 | 24 | Dull rubine | Dull rubine |

TABLE III (Continued)

| Example | DYESTUFF | Dyestuff No. | SHADE ON FIBRE Cotton | SHADE ON FIBRE Polyester Cotton |
|---|---|---|---|---|
| 76 | 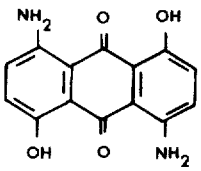 condensed with epoxysuccinic acid | 25 | Navy | Navy |
| 77 | 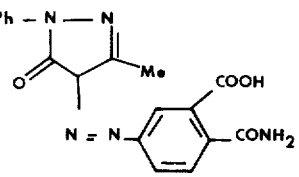 | 26 | Yellow | Yellow |
| 78 | 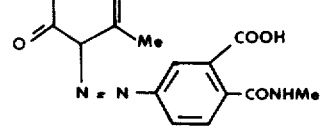 | 27 | Yellow | Yellow |

EXAMPLES 79–105

Dyestuffs are applied to cotton and to polyester/cotton blends as indicated in Table IV.

TABLE IV

| Ex. | DYESTUFF | Dyestuff NO. | Application Method | SHADE ON FIBRE Cotton | SHADE ON FIBRE Polyester Cotton |
|---|---|---|---|---|---|
| 79 | 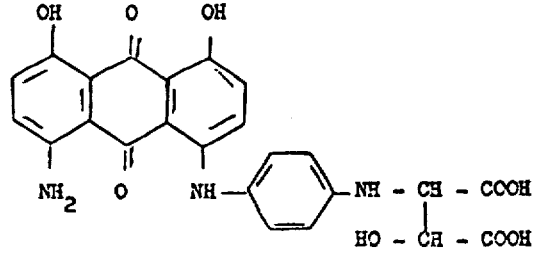 | 32 | E | Blue | Blue |
| 80 | 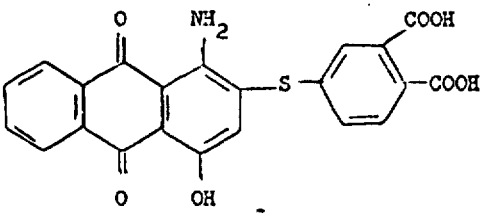 | 33 | E | Dull violet | Reddish violet |

TABLE IV-continued

| Ex. | DYESTUFF | Dyestuff NO. | Application Method | SHADE ON FIBRE Cotton | SHADE ON FIBRE Polyester Cotton |
|---|---|---|---|---|---|
| 81 | (structure: HOOCCH$_2$– and HOOC– substituted phenyl –N=N– pyrazolone with N–Ph, Me) | 34 | E, F with ammonia | Yellow | Yellow " |
| 82 | (anthracene-type structure with CO, CH, N–Me, NH, and HOOC, COOH substituted phenyl) | 35 | D, E | Bluish red | Red |
| 83 | (structure: Me, CN, HOOC, COOH substituted phenyl –N=N– C$_6$H$_4$–N(C$_2$H$_4$CCOCH$_3$)$_2$) | 36 | D E F with triethyl- amine | Dull red | Dull red |
| 84 | (structure: Me, CN, HOOC, COCH substituted phenyl –N=N– tolyl –N=N– pyrazolone with N–Ph, Me) | 37 | D E | | |
| 85 | HOOC–C$_6$H$_4$–N=N–C$_6$H$_4$–N(Et)(CH$_2$Ph) R = Me | 38 | D E F with ammonia | Orange | Reddish orange |
| 86 | As Example 85  R = isopropyl | 39 | E | Orange | Reddish orange |
| 87 | As Example 85  R = cyclohexyl | 40 | E | Orange | Reddish orange |
| 88 | As Example 85  R = tolyl | 41 | E | Orange | Reddish orange |
| 89 | (structure: ROOC–, HOOC– substituted phenyl –N=N– naphthalenyl with OH, CONHPh) R = Methyl | 42 | D E F with ammonia | Bright red | Bright yellowish red |

TABLE IV-continued

| Ex. | DYESTUFF | Dyestuff NO. | Application Method | SHADE ON FIBRE Cotton | Polyester Cotton |
|---|---|---|---|---|---|
| 90 | As Example 89  R = EtOC$_2$H$_4$ | 43 | D<br>E | Bright red | Bright yellowish red |
| 91 | As Example 89  R = n-propyl | 44 | D<br>E | Bright red | Bright yellowish red |
| 92 | [structure: chloronitro-diethylamino azo with NHCOCH$_2$S-phthalic acid] | 45 | D<br>E<br>F with ammonia | Violet | Violet |
| 93 | [anthraquinone structure with NH$_2$, OMe, NHCOCH$_2$S-phthalic acid] | 46 | D<br>E | Bluish red | Red |
| 94 | [dihydroxy nitro anthraquinone with NH-phenyl-NHCOCH(CH$_2$COOH)$_2$] | 47 | D<br>E | Greenish blue | Blue |
| 95 | [aminoanthraquinone with NH-phenyl-CH(COOH)CH$_2$COOH] | 48 | D<br>E<br>F with triethylamine | Blue | Blue |
| 96 | [dicarboxybenzothiazole-N=N-phenyl-N(Et)$_2$] | 49 | E | Red | Red |
| 97 | — | 1 | F with ammonia | Yellow | Yellow |
| 98 | — | 1 | F with methylamine | Yellow | Yellow |
| 99 | — | 1 | F with triethyl- | Yellow | Yellow |

TABLE IV-continued

| Ex. | DYESTUFF | Dyestuff NO. | Application Method | SHADE ON FIBRE Cotton | Polyester Cotton |
|---|---|---|---|---|---|
| 100 | — | 1 | F with ethanolamine | Yellow | Yellow |
| 101 | — | 13 | F with diethylamine | Yellow | Yellow |
| 102 | — | 27 | F with triethylamine | Yellow | Yellow |
| 103 | — | 14 | F with triethylamine | Yellow | Yellow |
| 104 | — | 16 | F with triethylamine | Orange brown | Orange brown |
| 105 | 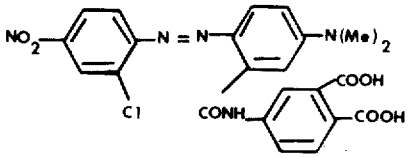 | 50 | F with ammonia | Rubine | Rubine |

APPENDIX TO THE EXAMPLES
PREPARATION OF DYESTUFFS

Dyestuff 1

A solution of the diazonium salt obtained by diazotising 2.175 parts of the hydrochloride of 4-aminophthalic acid in 2N hydrochloric acid is added to a solution of 1.75 parts of 1-phenyl-3-methyl-5-pyrazolone in 10 parts of water and 30 parts of 2N sodium hydroxide at 0°C. When coupling is complete the dye is precipitated by acidification with hydrochloric acid, filtered off, washed with water and dried at 50°C, yield 3.5 g.

Dyestuff 2

A mixture of 3.95 parts of N-ethyl-N-β-chloroethyl-3-toluidine, 3.9 parts of mercaptosuccinic acid, 2 parts of sodium hydroxide and 40 parts of water is stirred and heated under reflux for 16 hours during which time the reaction mixture is maintained at an alkaline pH value by the addition of sodium hydroxide solution. After cooling the reaction mixture is extracted three times with ethyl acetate and the aqueous phase evaporated to dryness in vacuo. The residue so obtained consists essentially of the disodium salt of N-ethyl-N-β(α,β-dicarboxyethylthio)-3-toluidine and is dissolved in 100 parts of 2N hydrochloric acid and coupled at 0°C with the diazonium salt obtained by the diazotisation of 2.76 parts of 4-nitroaniline in 50 parts of 2N hydrochloric acid. After coupling 20 parts of sodium acetate is added and the dyestuff filtered off, washed with water and dried to give 7 parts of N-ethyl-N-β(α,β-dicarboxyethylthio)ethyl-4-(4-nitrophenylazo)-3-toluidine.

Dyestuff 3

A solution of the diazonium salt prepared by the diazotisation of 2.17 parts of the hydrochloride of 4-aminophthalic acid in 20 parts of 2N hydrochloric acid is added to a solution of 1.64 parts of N,N-diethylaniline in 25 parts of 2N hydrochloric acid at 0°–5°C. After ½ hour sodium acetate is added to completely precipitate the dyestuff which is filtered off and purified by dissolution in dilute sodium hydroxide followed by precipitation with dilute mineral acid. The 2.2 parts of N,N-diethyl-4(3,4-dicarboxyphenylazo)aniline gives an orange solution in acetone with λmax 430. The dicarboxylic acid is converted to the anhydride by heating for 1 hour under reflux in acetic anhydride and then evaporating the solution obtained to dryness in vacuo. The anhydride of N,N-diethyl-4(3,4-dicarboxyphenylazo)aniline so obtained gives a red solution in acetone with λmax 494.

Dyestuff 4

1.6 parts of the anhydride of N,N-diethyl-4(3,4-dicarboxyphenylazo)aniline, (Dyestuff 3), is dissolved in 25 parts of methanol and the solution heated under reflux for 2 hours. The solution is then evaporated in vacuo to give N,N-diethyl-4(3-carboxy-4-carbomethoxyphenylazo)aniline which gives an orange solution in acetone with λmax 453.

Dyestuff 5

A solution of the amine obtained by the reduction of 1 part of 4-nitrophenylthiosuccinic acid as described below in dilute hydrochloric acid is diazotised at 0°–5°C. The diazonium salt is added to a solution of 0.75 parts of 1-phenyl-3-methyl-5-pyrazolone in 20 parts of 2N sodium hydroxide and 10 parts of water. After coupling is complete the dyestuff is precipitated by acidification with hydrochloric acid, filtered off and dried to give 1.03 parts of 1-phenyl-3-methyl-4-[4(α,β-dicarboxyethylthio)phenylazo]-5-pyrazolone.

The intermediate used above is prepared as follows:

A mixture of 24.5 parts of maleic anhydride, 10 parts of sodium hydroxide and 100 parts of water is heated to the boil, cooled and the solution added to a mixture of 36.25 parts of 4-nitrothiophenol, 150 parts of ethanol and 2.5 parts of piperidine. The mixture is then stirred and heated under reflux for 3 hours, cooled, filtered and the filtrate acidified with hydrochloric acid, diluted with 250 parts of water and 400 parts of ice. The precipitated 4-nitrophenylthiosuccinic acid is filtered off, washed with water and dried. Yield 38.3 parts, m.p. 166°–167°C.

1 Part of the nitro compound so obtained is mixed with 25 parts of water, 1 part of iron powder and 0.5 parts of hydrochloric acid and the mixture heated under reflux for 3 hours. After filtering from the iron sludge which is washed well with water and then dilute sodium hydroxide solution, the filtrate is again filtered to remove iron salts and is then acidified with hydrochloric acid, and diazotised.

Dyestuff 6

The diazonium salt obtained by the diazotisation of 5.32 parts of N(4-aminobenzoyl)glutaric acid in 20 parts of water and 75 parts of 2N hydrochloric acid is added to a solution of 3.5 parts of 1-phenyl-3-methyl-5-pyrazolone in 20 parts of water and 100 parts of 2N sodium hydroxide whilst maintaining an alkaline reaction by the addition of more 2N sodium hydroxide. After coupling the dyestuff is precipitated by acidification, filtered off, washed and dried. Yield of 1-phenyl-3-methyl-4(4-$\alpha,\gamma$-dicarboxypropylaminocarbonylphenylazo)-5-pyrazolone is 5.6 parts.

Dyestuff 7

In place of the 1-phenyl-3-methyl-5-pyrazolone used in the procedure for Dyestuff 6 there is used 3.6 parts of N-ethyl-3-cyano-4-methyl-6-hydroxy-2-pyridone. 5.2 parts of N-ethyl-3-cyano-4-methyl-5(4-$\alpha,\gamma$-dicarboxypropylaminocarbonylphenylazo)-6-hydroxy-2-pyridone are obtained.

Dyestuff 8

The diazonium compound obtained by the diazotisation of 6.6 parts of 4-aminophenylsuccinic acid in 5 parts of concentrated hydrochloric acid and 50 parts of water is added to a solution of 3.48 parts of 1-phenyl-3-methyl-5-pyrazolone in 20 parts of water and 40 parts of 2N sodium hydroxide at 0°–5°C whilst maintaining an alkaline reaction by the addition of more 2N sodium hydroxide solution. After 15 minutes the solution is acidified and the precipitated 1-phenyl-3-methyl-4($\alpha,\beta$-dicarboxyethylphenylazo)-5-pyrazolone filtered off, washed with water and dried. Yield 5.6 parts.

Dyestuff 9

The diazonium salt obtained by the diazotisation of 5.9 parts of the hydrochloride of 4-aminophthalic acid in 20 parts of water and 40 parts of 2N hydrochloric acid is added to a solution of 3.6 parts of N-ethyl-3-cyano-4-methyl-6-hydroxy-2-pyridone in 20 parts of water, 5 parts of a 32% solution of sodium hydroxide and 10 parts of sodium acetate at 0°C. After 15 minutes the dyestuff is precipitated by the addition of hydrochloric acid and isolated by filtration. The crude product is dissolved in 400 parts of N sodium carbonate solution, filtered and the filtrate just acidified with hydrochloric acid. The precipitated N-ethyl-3-cyano-4-methyl-5-(3,4-dicarboxyphenylazo)-6-hydroxy-2-pyridone is filtered off, washed acid free and dried. Yield 6.4 parts.

Dyestuff 10

A mixture of 1.2 parts leucoquinizarin, 2 parts 4-aminophenylsuccinic acid, 20 parts of ethanol, 10 parts of water and 0.6 parts of boric acid is stirred and heated under reflux for 18 hours, cooled, filtered and the filtrate acidified with hydrochloric acid. The precipitated 1-hydroxy-4($\alpha,\beta$-dicarboxyethyl)anilino anthraquinone is filtered off, washed with 50% aqueous methanol and dried.

Dyestuff 11

2.38 parts of 4-aminobenzylaminosuccinic acid, the preparation of which is described below, is diazotised in dilute hydrochloric acid and coupled with 1.75 parts of 1-phenyl-3-methyl-5-pyrazolone in dilute sodium hydroxide solution at 0°–5°C. The dyestuff isolated by acidification and filtration is 1-phenyl-3-methyl-4[4($\alpha,\beta$-dicarboxyethylaminomethylene)phenylazo]-5-pyrazolone.

The 4-aminobenzylaminosuccinic acid may be prepared as follows:

153 parts of 4-nitrobenzylamine and 38 parts of 32% sodium hydroxide solution are added simultaneously over about 1 hour to 500 parts of a 24% aqueous solution of sodium bisulphite and 446 parts of water maintained as 95°–100°C and a pH range of 4–5. Half an hour after completing the additions the mixture is cooled to 0°–5°C and the precipitated 4-aminomethylenephenylsulphamic acid filtered off, washed with acetone and dried. 19 Parts of the sulphamic acid derivative dissolved in 100 parts of water is added to a solution of 11.6 parts of maleic acid in 40 parts of water containing 4 parts of sodium hydroxide and the whole stirred and heated under reflux for 9 hours. The reaction mixture is cooled, screened and the filtrate salted to 20% and neutralized with acetic acid. The precipitated 4-aminobenzylaminosuccinic acid is filtered off, washed with acetone and dried.

Dyestuff 12

A mixture of 4.6 parts of N($\beta$-hydroxy-$\gamma$-chloro-n-propyl)-N-ethyl-3-toluidine, 3.9 parts of thiosuccinic acid, 2 parts of sodium hydroxide and 20 parts of water is stirred and heated at 95°C for 18 hours with periodic addition of 2N sodium hydroxide to maintain a pH value of 8. After cooling to 20°C the reaction mixture is extracted with 3 × 10 parts of ethylacetate and the aqueous phase which contains N[$\gamma(\alpha,\beta$-dicarboxyethylthio)$\beta$-hydroxy-n-propyl]-N-ethyl-3-toluidine retained. The solution is cooled to 0.5°C and the diazonium salt obtained by the diazotisation of 2.76 parts of 4-nitroaniline in 10 parts of concentrated hydrochloric acid and 50 parts of water is added and an alkaline reaction maintained throughout by the addition of 2N sodium hydroxide. When the coupling is complete the mixture is acidified with hydrochloric acid and the precipitated tarry dyestuff isolated by decantation. The dyestuff is purified by dissolving in dilute sodium carbonate solution, screening, then adding sodium acetate followed by acidification with acetic acid. The salt of the dyestuff is filtered off, then treated with dilute hydrochloric acid to give 2.1 parts of N[$\gamma(\alpha,\beta$-dicarboxyethylthio)$\beta$-hydroxy-n-propyl]N-ethyl-4(4-nitrophenylazo)-3-toluidine.

Dyestuff 13

A mixture of 5.8 parts of Dyestuff 1 and 80 parts of acetic anhydride is heated at the boil for 2 hours whilst allowing slight distillation to occur. The resultant solution is cooled and the precipitated anhydride dyestuff filtered off, warmed with a petroleum ether fraction (b.p. 40°–60°C) and dried. Yield 4.2 parts. 1 Part of this anhydride dyestuff and 75 parts of methanol is heated under reflux for 20 hours then filtered hot and the filtrate evaporated to dryness. 0.7 parts of 1-phenyl-3-methyl-4(3-carboxy-4-carbomethoxyphenylazo)-5-pyrazolone are obtained.

Dyestuff 14

A mixture of 1 part of the anhydride dyestuff used for Dyestuff 13 and 25 parts of $\beta$-ethoxyethanol is heated under reflux for 2 hours. After evaporating to small bulk and cooling to 20°C the solution is diluted with petroleum ether (b.p. 40°–60°C) and the precipitated dyestuff filtered off and dried. 1.2 parts of 1-phenyl-3- methyl-4(3-carboxy-4-β-ethoxyethoxycarbonyl-phenylazo)-5-pyrazolone is obtained.

Dyestuff 15

The diazonium salt obtained by diazotising 1.38 parts of 4-nitroaniline in 25 parts of 2N hydrochloric acid is added to a solution of 2.1 parts of anilinosuccinic acid in 25 parts of 2N hydrochloric acid at 0°C. When coupling is complete sodium acetate is added to precipitate the dyestuff which is filtered off, dissolved in dilute sodium carbonate solution, screened and precipitated with mineral acid. The N-(α,β-dicarboxyethyl)4-(4-nitrophenylazo)aniline so obtained melts at 142°–144°C.

Dyestuffs 16 and 17

The diazonium salt obtained by the diazotisation of 1.38 parts of 4-nitroaniline in 5 parts of concentrated hydrochloric acid and 5 parts of water is added to a solution of 3 parts of 2-anisidinosuccinic acid monomethyl ester in 30 parts of acetone and 10 parts of water at 0°–5°C. When coupling is complete the dyestuff is precipitated by the addition of sodium acetate and dilution with water. The monomethyl ester of N(α,β-dicarboxyethyl)4-(4-nitrophenylazo)2-anisidine (Dyestuff 16) is filtered off, washed with water, then petroleum ether (b.p. 40°–60°C) and dried.

The coupling component used in the preparation of the above dyestuff may be obtained as follows:

A solution of 19.3 parts of maleic anhydride in 25 parts of methanol is heated under reflux for ½ hour and then evaporated under reduced pressure. The residue so obtained is cooled to 0°–5°C and 40 parts of triethylamine added over 10 minutes keeping the temperature below 15°C. 36 Parts of 2-anisidine is then added and the mixture heated at 100°C for 17 hours. The triethylamine is then distilled off and the residue poured into 1000 parts of water and the mixture just acidified with hydrochloric acid. The precipitated monomethyl ester of 2-anisidinosuccinic acid is filtered off, washed with water and dried, m.p. 135°–138°C.

The monomethyl ester of N(α,β-dicarboxyethyl)4(4-nitrophenylazo)-2-anisidine may be hydrolysed to the dicarboxylic acid (Dyestuff 17) by warming the dyestuff with 2N sodium hydroxide.

Dyestuff 18

3.5 Parts of 4-chlorosulphonylphthalic acid is added to a solution of 3 parts of N(β-aminoethyl)-3-cyano-4-methyl-5-(2-nitrophenylazo)-6-hydroxy-2-pyridone in 100 parts of pyridine at 70°C and the mixture then heated under reflux for 15 minutes. The reaction mixture is filtered hot and the filtrate poured into an excess of dilute hydrochloric acid. The precipitated N[β-(3,4-dicarboxyphenylsulphonylamino)ethyl]3-cyano-4-methyl-5-(2-nitrophenyl azo)6-hydroxy-2-pyridone is filtered off, washed with water and dried at 70°C.

The N(β-aminoethyl)3-cyano-4-methyl-5-(2-nitrophenylazo) 6-hydroxy-2-pyridone used in the above preparation may be obtained as follows:

A mixture of 21.2 parts of ethyl cyanoacetate, 104 parts of ethylene diamine of 64% strength and 25.6 parts of ethyl acetoacetate is stirred at 80°C for 6 hours and then evaporated under reduced pressure to remove excess ethylene diamine. The residue is cooled to 20°C and acidified with concentrated hydrochloric acid and the precipitated N-β-aminoethyl-3-cyano-4-methyl-6-hydroxy-2-pyridone filtered off, washed with water and dried.

The diazonium salt obtained by the diazotisation of 13.8 parts of 2-nitroaniline in 200 parts of water and 22 parts of sulphuric acid is added to a solution of 18.45 parts of the above pyridone coupling component dissolved in 300 parts of water by the addition of sodium hydroxide, the pH being maintained at 4–6 and the temperature between 0°–5°C during the coupling. When coupling is complete the product is filtered off, washed with water and dried to give 31.8 parts of N-(β-aminoethyl)3-cyano-4-methyl-5-(2-nitrophenylazo)6-hydroxy-2-pyridone.

Dyestuff 19

The diazonium salt obtained by the diazotisation of 2.3 parts of 4-aminophthalic acid in 10 parts of 2N hydrochloric acid and 20 parts of water is added to 2 parts of 3-carbomethoxy-2-naphthol in 20 parts of 2N sodium hydroxide and 20 parts of water at 0°–5°C. Acetone and sufficient 2N sodium hydroxide are added to maintain an alkaline reaction and keep the dyestuff in solution. When coupling is complete the reaction mixture is acidified with hydrochloric acid and the precipitated 1-(3,4-dicarboxyphenylazo)3-carbomethoxy-2-naphthol filtered off, washed with water and dried.

Dyestuff 20

By replacing the 3-carbomethoxy-2-naphthol in the Dyestuff 19 process by 2.75 parts of 2-hydroxy-3-naphthoic di-β-hydroxyethylamide, 3 parts of 1-(3,4-dicarboxyphenylazo)-3-(N,N-di-β-hydroxyaminocarbonyl)2-naphthol are obtained.

Dyestuffs 21 and 22

The diazonium salt obtained by the diazotisation of 2.3 parts of 4-aminophthalic acid in 10 parts of 2N hydrochloric acid and 20 parts of water is added to a solution of 1.53 parts of 2,5-dimethoxyaniline in 20 parts of 2N hydrochloric acid and 20 parts of water at 0°–5°C. When coupling is complete the solution is diluted with water and the precipitated 2,5-dimethoxy-4-(3,4-dicarboxyphenylazo)aniline (Dyestuff 21) filtered off, washed with water and dried.

This dyestuff is dissolved in 20 parts of 2N hydrochloric acid and 20 parts of water and diazotised at 0°–5°C and the diazonium salt so obtained added to a solution of 1.74 parts of 1-phenyl-3-methyl-5-pyrazolone in 20 parts of 2N sodium hydroxide and 20 parts of water at 0°–5°C, more 2N sodium hydroxide being added as required to maintain an alkaline reaction. When coupling is complete the mixture is acidified and the precipitated 1-phenyl-3-methyl-4[4(3,4-dicarboxyphenylazo)-2,5-dimethoxyphenylazo]5-pyrazolone (Dyestuff 22) filtered off, washed with water and then purified by dissolving in dilute sodium carbonate solution, screening from insoluble material and precipitating with mineral acid.

Dyestuff 23

1 part of 4-chlorosulphonyl phthalic acid is added to a solution of 0.5 parts of 1-hydroxy-4-(4-aminoanilino)-anthraquinone, (itself obtained by the reaction of leucoquinizarin with 4-phenylene diamine) in 25 parts of dioxan. The mixture is heated under reflux for 5½ hours, filtered hot, and the filtrate poured into water. The precipitated product is filtered off, dissolved in dilute sodium carbonate solution at 20°C, screened, and the filtrate acidified with mineral acid to give 0.4 parts of 1-hydroxy-4-[4-(3,4-dicarboxy phenylsulphonylamino)anilino]anthraquinone.

Dyestuff 24

This is prepared by following the procedure described below for Dyestuff 25, using 1.25 parts of 1-hydroxy-4-aminoanthraquinone in place of the 4,8- diaminoanthrarufin.

Dyestuff 25

A mixture of 1.25 parts of 4,8-diaminoanthrarufin, 1.6 parts of epoxysuccinic acid and 15 parts of 1,2-dichlorobenzene is heated under reflux for 24 hours. The solvent is removed by steam distillation from a dilute sodium carbonate solution. The mixture is then filtered from uncharged diaminoanthrarufin and the filtrate acidified with mineral acid. The dyestuff precipitated consists essentially of a mixture of 4(α, β-dicarboxy-β-hydroxyethylamino)8-aminoanthrarufin and 4,8-di(α,β-diarboxy-β-hydroxyethylamino)anthrarufin.

Dyestuffs 26 to 29

Dyestuffs 26 to 29 are prepared by gravel milling a mixture of 3.88 parts of the anhydride of 1-phenyl-3-methyl-4(3,4-dicarboxyphenylazo)-5-pyrazolone (Dyestuff 1), 40 parts of water and 3 parts of conc.ammonia solution or 2 parts of 40% methylamine solution, or 1.5 parts of diethylamine or 1.5 parts of cyclohexylamine. After 24 hours the reaction mixture is acidified with hydrochloric acid and the precipitated dyestuff filtered off, washed with water and dried.

Dyestuff 30

Dyestuff 30 is prepared by reacting a solution of 3.88 parts of the anhydride of 1-phenyl-3-methyl-4(3,4-dicarboxyphenylazo)-5-pyrazolone in 40 parts of tetrahydrofuran with 3 parts of aniline at 20°C for 3 hours, then evaporating off the solvent under reduced pressure. The residue is triturated with dilute hydrochloric acid, filtered and washed acid free with water and dried to give Dyestuff 30.

Dyestuff 31

Dyestuff 31 is prepared in an analogous way to Dyestuff 1 using 3-aminophthalic acid in place of 4-aminophthalic acid.

Dyestuff 32

The dyestuff is prepared by the reaction of 4(4-aminoanilino)-5-pminochrysazin with epoxysuccinic acid.

Dyestuff 33

The dyestuff is prepared by the condensation of 1-amino-2-bromo-4-hydroxysuccinic acid with 4-mercaptophthalic acid. The 4-mercaptophthalic acid itself being made by the reduction of 4-chlorosulphonylphthalic acid with zinc in dilute sulphuric acid.

Dyestuff 34

4-Aminohomophthalic acid is diazotised and coupled with 1-phenyl-3-methyl-4-pyrazolone. The 4-aminohomophthalic acid is itself prepared by the nitration of homophthalic acid followed by reduction with tin and hydrochloric acid.

Dyestuffs 36, 42, 43, 44, 49 and 50

These dyestuffs are prepared in the usual manner by diazotisation of the appropriate amine and then coupling with the appropriate coupling component.

Dyestuff 35

This dyestuff is prepared by the condensation of 3-methyl-6-bromoanthrapyridone with 3-aminophthalic acid.

Dyestuff 37

3-amino-4-cyano-5-methylphthalic acid is diazotised and coupled with m-toluidine and the product diazotised and coupled with 1-phenyl-3-methyl-5-pyrazolone.

Dyestuff 38, 39, 40 and 41

These dyestuffs are prepared by the reaction of the anhydride of 4(3,4-dicarboxyphenylazo)-N-ethyl-N-benzylaniline with the appropriate amine.

Dyestuffs 45 and 46

These products are prepared by the acylation of 3-amino-4(2-chloro-4-nitrophenylazo)N,N-diethylaniline and 1-amino-2-methoxy-4-aminoanthraquinone with chloroacetyl chloride followed by reaction of the products with 4-mercaptophthalic acid.

Dyestuff 47

The condensation product of 4,5-dinitrochrysazin with p-phenylenediamine is acylated with tricarballylic anhydride.

Dyestuff 48

1-amino-2-sulpho-4-bromoanthraquinone is condensed with 4-aminophenylsuccinic acid and the product desulphonated by reduction with sodium hydrosulphite.

We claim:

1. A process for dyeing textile fibers comprising cellulose or blends of cellulose with polyester fibres which process comprises applying to said fibres an unsulphonated dyestuff containing a dicarboxylic cyclic anhydride grouping or a dicarboxylic acid grouping such that cyclic anhydride formation can occur by loss of water therefrom, or a half ester or half amide of such a dicarboxylic acid grouping, any carboxylic acid group in the said dyestuff being present in free acid form or in the form of a salt with ammonia or a volatile amine, and heating the textile fibre until fixation of the dyestuff takes place.

2. Process according to claim 1 wherein the said dyestuff contains a grouping

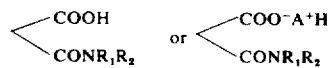

wherein $R_1$ is hydrogen or an alkyl or substituted alkyl group of 1 to 5 carbon atoms or an aryl group, $R_2$ is hydrogen or an alkyl or substituted alkyl group of 1 to 5 carbon atoms and A represents a molecule of ammonia or a volatile amine, particularly an aliphatic or cycloaliphatic amine.

3. Process according to claim 1 wherein said dyestuff contains a dicarboxylic grouping with the two CO groups thereof in adjacent positions on an carbocyclic aromatic ring.

4. Process according to claim 3 wherein the said two CO groups are in ortho position on a benzene ring.

5. Process according to claim 1 wherein said dyestuff contains a dicarboxylic grouping with the two CO groups thereof in anhydride forming positions on an alkyl chain.

6. Process according to claim 5 wherein the said two CO groups are in the 1,2-position on an alkyl chain.

7. Process according to claim 1 wherein said dyestuff contains a dicarboxylic grouping with one CO group on a carbocyclic aromatic ring and one in anhydride forming position on a side chain.

8. Process according to claim 1 wherein dyestuff in the form of a water-soluble salt is applied to the textile fibre and free acid dyestuff is thereafter liberated by means of mineral or organic acid or a substance which generates an acid on heating.

9. Process according to claim 1 wherein dyestuff is applied to the textile fibre from an aqueous or non-aqueous liquor or by a printing technique and subsequently baked or steamed at a temperature above 125°C.

10. Process according to claim 9 wherein the dyestuff is in the form of a salt with ammonia or a volatile amine.

11. Process according to claim 9 wherein the temperature is 180° to 210°C.

12. Process according to claim 1 wherein the dyestuff is of the azo series.

13. Process according to claim 1 wherein the dyestuff is of the anthraquinone series.

* * * * *